United States Patent
Lu et al.

(10) Patent No.: US 10,565,334 B1
(45) Date of Patent: Feb. 18, 2020

(54) TARGETED DELAY OPTIMIZATION THROUGH PROGRAMMABLE CLOCK DELAYS

(71) Applicant: Xilinx, Inc., San Jose, CA (US)

(72) Inventors: Ruibing Lu, Santa Clara, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 117 days.

(21) Appl. No.: 15/849,216

(22) Filed: Dec. 20, 2017

(51) Int. Cl.
*G06F 17/50* (2006.01)
*G01R 31/317* (2006.01)
*G06F 11/32* (2006.01)

(52) U.S. Cl.
CPC ... *G06F 17/5031* (2013.01); *G01R 31/31725* (2013.01); *G06F 11/323* (2013.01); *G06F 17/5054* (2013.01); *G06F 2217/62* (2013.01)

(58) Field of Classification Search
CPC ............ G06F 17/5054; G06F 17/5031; G06F 17/5077; G06F 1/10; G06F 17/505; G06F 11/323; G06F 2217/62; G01R 31/31725
See application file for complete search history.

(56) References Cited

U.S. PATENT DOCUMENTS

| | | | | |
|---|---|---|---|---|
| 5,659,484 A * | 8/1997 | Bennett | ............... | G06F 17/5031 716/113 |
| 6,760,899 B1 * | 7/2004 | Young | ................. | G06F 17/5072 716/113 |
| 6,952,813 B1 | 10/2005 | Rahut | | |
| 7,069,461 B1 * | 6/2006 | Chan | ........................ | G11O 5/14 713/322 |
| 7,152,217 B1 * | 12/2006 | Srinivasan | .......... | G06F 17/5068 716/113 |
| 7,206,959 B1 * | 4/2007 | Chan | ........................ | G06F 1/08 713/501 |
| 7,216,319 B1 | 5/2007 | Yau et al. | | |
| 7,251,803 B2 * | 7/2007 | Suaris | ................. | G06F 17/5054 716/104 |

(Continued)

OTHER PUBLICATIONS

Altera Netlist Optimization and Physical Synthesis, Quartus II Handbook, version 13.1, Nov. 2013, 16 pages, URL http://www.altera.com/literature/hbigts/qts_qii52007.pdf.

(Continued)

*Primary Examiner* — Helen Rossoshek
(74) *Attorney, Agent, or Firm* — LeRoy D Maunu (57) ABSTRACT

Disclosed approaches for processing a circuit design include determining first slacks of cells, including a target cell, coupled to receive a clock signal through a first clock leaf. The first slacks are based on a current delay value specified for a first programmable delay circuit. The method predicts second slacks of the cells based on another delay value specified for the first programmable delay circuit, and then determines whether or not the second slacks indicate a degradation in timing relative to the first slacks. The current delay value of the first programmable delay circuit is adjusted to the other delay value in response to determining the second slacks indicates no degradation in timing. The target cell is reconnected to receive the clock signal from a second clock leaf having a second programmable delay circuit specified with the other delay value in response to determining the second slacks indicates degradation in timing.

20 Claims, 7 Drawing Sheets

(56) References Cited

U.S. PATENT DOCUMENTS

| | | | |
|---|---|---|---|
| 7,295,639 B1 | 11/2007 | Cory | |
| 7,313,778 B1* | 12/2007 | Stenz | G06F 17/5054 716/113 |
| 7,430,728 B1 | 9/2008 | Rahut | |
| 7,636,876 B1* | 12/2009 | Srinivasan | G06F 17/5072 714/701 |
| 7,689,942 B2 | 3/2010 | Acar | G06F 17/5031 716/134 |
| 7,904,860 B1 | 3/2011 | Rahut | |
| 8,001,504 B1 | 8/2011 | Campbell | |
| 8,181,139 B1* | 5/2012 | Chen | G06F 17/5072 716/116 |
| 8,261,218 B1* | 9/2012 | Fung | G06F 17/5054 716/108 |
| 8,332,793 B2* | 12/2012 | Bose | G06F 17/5068 716/108 |
| 8,423,939 B1* | 4/2013 | Hurst | G06F 17/505 703/19 |
| 8,762,915 B1* | 6/2014 | Prabhakar | G06F 17/505 716/108 |
| 8,830,094 B1 | 9/2014 | Erdmann | |
| 8,860,502 B2* | 10/2014 | Gemmeke | G06F 1/324 327/113 |
| 9,003,221 B1 | 4/2015 | Abugharbieh et al. | |
| 9,143,122 B1 | 9/2015 | Gaide | |
| 9,455,691 B2* | 9/2016 | Goyal | H03K 3/35625 |
| 2014/0021993 A1* | 1/2014 | Poddutur | G06F 17/5054 327/166 |
| 2015/0228360 A1* | 8/2015 | Su | G11C 29/56012 714/718 |
| 2018/0005708 A1* | 1/2018 | Kawa | G06F 17/5072 |
| 2018/0101624 A1* | 4/2018 | Dhar | G06F 17/5031 |

OTHER PUBLICATIONS

Altera Timing Closure and Optimization, Quartus II Handbook, version 13.1, Nov. 2013., 46 pages, URL: http://www.altera.com/literature/hb/qts/qts_qii52007.pdf.

Synopsys Synplify Premier Brochure, 2011, 4 pages, URL: http://www.synopsys.com/Tools/Implementation/FPGAImplementation/Documents/synpremier-brochure.pdf.

Fishburn, J., "Clock skew optimization," IEEE Trans. On Comput., vol. 39, No. 7, pp. 945-951, 1990.

Ni, M., et al., "A fast heuristic algorithm for multidomain clock skew scheduling," IEEE Trans. On VLSI, vol. 18, No. 4, pp. 630-637, Apr. 2010.

Zhi, Y., et al., "A practical method for multi-domain clock skew optimization," in Proc. Asian and South Pacific Design Automation Conference, IEEE, Mar. 2011, pp. 521-526.

Casanova, J., et al., "Multi-level clustering for clock skew optimization," in IEEE Proc. ICCAD, Nov. 2009, 547-554.

* cited by examiner

TARGETED DELAY OPTIMIZATION THROUGH PROGRAMMABLE CLOCK DELAYS

TECHNICAL FIELD

The disclosure generally relates to optimizing timing in integrated circuit designs.

BACKGROUND

Designing circuits, such as those implemented on field programmable gate arrays (FPGAs), can be a complex process. For example, a user of the FPGA can have aggressive timing requirements for an FPGA circuit design. Meeting timing requirement(s) is one of the most challenging problems that circuit designers face. A lot of time and resources may be spent trying to resolve timing violations in circuit designs. As the complexity of circuit designs increases, new techniques for physical optimization of circuit designs are becoming increasingly important from timing perspective. Automated computer-aided design (CAD) implementation tools help circuit designers; however, automated place and route electronic design automation (EDA) solutions may be unable to resolve timing issues in the circuit design. As a result, circuit designers have to spend a lot of manual effort and time trying to close timing.

SUMMARY

A disclosed method includes determining a first set of slacks of a plurality of cells, including a target cell, coupled to receive a clock signal through a first clock leaf of a plurality of clock leaves of the circuit design. Slacks of the first set are based on a current delay value specified for a first programmable delay circuit of the first clock leaf. The method predicts a second set of slacks of the cells based on another delay value specified for the first programmable delay circuit, and then determines whether or not the second set of slacks indicates a degradation in timing relative to the first set of slacks. The current delay value of the first programmable delay circuit of the first clock leaf is adjusted to the other delay value in response to determining the second set of slacks indicates no degradation in timing relative to the first set of slacks. The target cell is reconnected to receive the clock signal from a second clock leaf having a second programmable delay circuit specified with the other delay value, in response to determining the second set of slacks indicates degradation in timing relative to the first set of slacks.

A disclosed system includes a processor and a memory and storage arrangement coupled to the processor. The memory and storage arrangement is configured with instructions that when executed by the processor cause the processor to perform operations including: determining a first set of slacks of a plurality of cells, including a target cell, coupled to receive a clock signal through a first clock leaf of a plurality of clock leaves of the circuit design. Slacks of the first set are based on a current delay value specified for a first programmable delay circuit of the first clock leaf. A second set of slacks of the cells, based on another delay value specified for the first programmable delay circuit of the first clock leaf is predicted. Whether or not the second set of slacks indicates a degradation in timing relative to the first set of slacks is determined. The current delay value of the first programmable delay circuit of the first clock leaf is adjusted to the other delay value in response to determining the second set of slacks indicates no degradation in timing relative to the first set of slacks. The target cell is reconnected to receive the clock signal from a second clock leaf having a second programmable delay circuit specified with the other delay value, in response to determining the second set of slacks indicates degradation in timing relative to the first set of slacks.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

A circuit design may include a plurality of clock leafs through which a clock signal is distributed to one or more cells. Each clock leaf has a programmable delay circuit that can be configured with a value that delays the clock signal through the leaf by an amount indicated by the programmed value. A clock leaf can be connected to hundreds of cells. While adjusting a delay value specified for a programmable delay circuit of a clock leaf can resolve a timing violation of one or more of the cells, the adjustment may also degrade the timing of other cells. For example, resolving a setup violation for one of the cells connected to a clock leaf may introduce a hold violation on another cell connected to the clock leaf.

The disclosed approaches provide automated methods and systems that enable circuit designers to improve and/or close the timing of circuit designs, and/or improve the quality of results (QoR) of circuit designs. The disclosed methods and systems optimize timing of circuit designs in an opportunistic manner by changing leaf-level connections of a clock signal to elements of the circuit design. In one approach, the connections are changed in a placed-androuted circuit design. An electronic design automation (EDA) computer system can be programmed to determine a first set of slacks of the cells coupled to receive a clock signal through a first clock leaf. The slacks of the first set are based on a current delay value specified for a programmable delay circuit of the first clock leaf. The EDA system predicts a second set of slacks of the cells based on an alternative delay value specified for the programmable delay circuit of the first clock leaf, and determines whether or not the second set of slacks indicates a degradation in timing relative to the first set of slacks. In response to determining that the second set of slacks indicates no degradation in timing relative to the first set of slacks, the EDA system adjusts the current delay value of the programmable delay circuit to the alternative delay value. In response to determining that the second set of slacks indicates degradation in timing relative to the first set of slacks, the EDA system reconnects the target cell to receive the clock signal from a second clock leaf having a programmable delay circuit specified with the alternative delay value.

Figure 1:
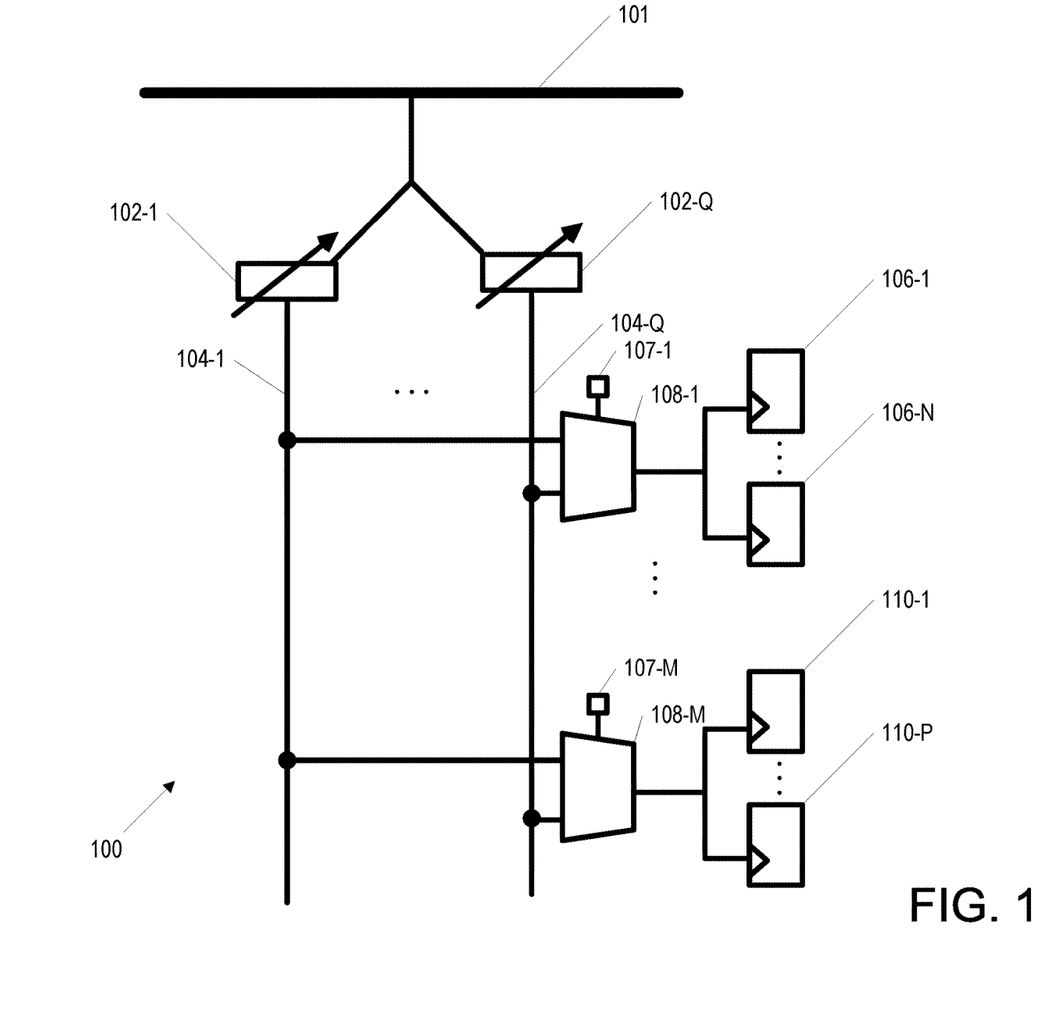
FIG. 1 illustrates a block diagram of clock leafs and cells of a circuit design.

FIG. 1 illustrates a block diagram of clock leafs and cells of a circuit design. Circuit design 100 includes a plurality of clock leafs 104-1 to 104-Q (collectively referred to as clock leafs 104) coupled to receive global clock signal 101. For ease of reference, the signal lines in the figures that carry the clock signal and delayed versions of the clock signal will be referred to as the clock signal. Each of the clock leafs 104 includes a respective programmable delay circuit 102-1 to 102-Q (collectively referred to as programmable delay circuits 102) that delays global clock signal 101 through the corresponding clock leaf. One delay value of a range of delay values (e.g., one to four) can be specified for the programmable delay circuits 102. Each of the delay values can correspond to a particular time delay (e.g., 100 picoseconds (ps)). The time delay can increase as the delay values increase. A plurality of flip-flops 106-1 to 106-N and 110-1 to 110-P (collectively referred to as flip-flops 106 and 110) are coupled to the clock leafs 104 via multiplexers 108-1 to 108-M (collectively referred to as multiplexers 108), respectively. Specific implementations are not limited to any particular quantity of clock leaves, programmable delay circuits, multiplexers, or cells. Although circuit design 100 includes flip-flops, the disclosed circuitry can be used with other types of cells, including, for example, memory blocks or digital signal processor circuits (DSPs).

A timing violation of a target flip-flop, for example, flip-flop 106-1, can be resolved by changing the delay of the clock signal received by flip-flop 106-1. The delay can be changed by adjusting the delay value specified for a programmable delay circuit of a clock leaf, for example, programmable delay circuit 102-1. Control circuits 107-1 to 107-M (collectively referred to as control circuitry 107) provide control signals to multiplexers 108-1 to 108-M for selecting between the clock signal on clock leaf 104-1 or 104-Q for provision to the target flip-flop 106-1. If flip-flop 106-1 is a startpoint flip-flop and the timing violation is a hold violation, then the delay value specified for programmable delay circuit 102-1 might be increased, without selecting a different one of the clock leafs 104. As an example, if the delay value specified for programmable delay circuit is two, then the delay value can be increased to three to resolve a hold violation of flip-flop 106-1. If flip-flop 106-1 is a starting point flip-flop and the timing violation is a setup violation, then the delay value specified for programmable delay circuit 102-1 can be decreased. As an example, if the delay value specified for programmable delay circuit is two, then the delay value can be decreased to one to resolve a setup violation of flip-flop 106-1. In accordance with the disclosed circuits and methods, however, the delay value specified for programmable delay circuit 102-1 should be adjusted only if the adjustment does not degrade the timing of the other flip-flops that receive the clock signal through clock leaf 104-1, such as flip-flops 106-2 to 106-N and/or flip-flops 110-1 to 110-P. In an exemplary implementation, the control circuitry 107 can be implemented as configuration memory cells of programmable logic.

To avoid degradation in the timing of the other flip-flops, two sets of slacks for the flip-flops of clock leaf 104-1 are compared. Slacks of a first set of slacks are determined based on the delay value currently specified for programmable delay circuit 102-1 and slacks of a second set are predicted based on another delay value that would be specified for programmable delay circuit 102-1. If the second set of slacks indicates no degradation in timing relative to the first set of slacks, then the delay value currently specified for programmable delay circuit 102-1 is adjusted to the other delay value. If the second set of slacks indicates degradation in timing relative to the first set of slacks, then flip-flop 106-1 can be reconnected to another existing clock leaf having a programmable delay circuit specified with the other delay value. If a clock leaf having a programmable delay circuit programmed with the desired delay value does not exist in the circuit design 100, the EDA system can instantiate a new clock leaf, specify the desired delay value for the programmable delay circuit in the new clock leaf, and connect the flip-flop to the new clock leaf through the associated multiplexer.

Figure 2:
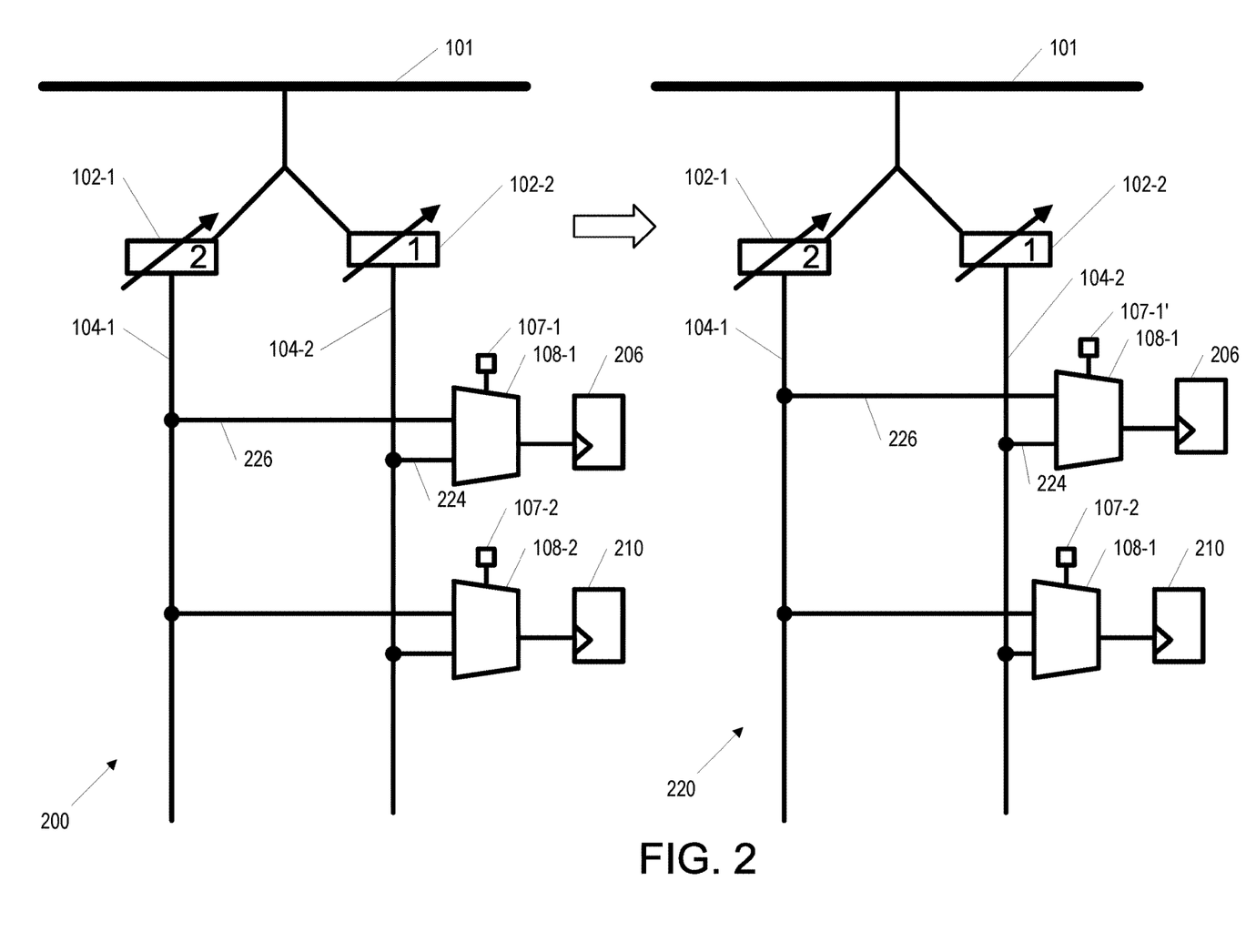
FIG. 2 illustrates before and after views of a circuit design in which a target cell is reconnected to a clock leaf having a different delay value.

FIG. 2 illustrates before and after views of a circuit design in which a target cell is reconnected to a clock leaf having a different delay value. FIG. 2 is similar to FIG. 1. For ease of illustration, however, only two flips-flops 206 and 210 and their respective multiplexers 108-1 and 108-2 and control circuitry 107-1 and 107-2 are shown. Circuit design 200 includes flip-flops 206 and 210 receiving a clock signal provided by clock leaf 104-2 through multiplexers 108-1 and 108-2 as controlled by control circuits 107-1 and 107-2. Programmable delay circuit 102-2 is configured with a delay value of 1. In the example of FIG. 2, flip-flop 206 is the target flip-flop. To resolve a hold violation of flip-flop 206, the delay of the clock signal received by flip-flop 206 is to be adjusted. In response to determining that adjusting the delay value specified for programmable delay circuit 102-2 from one to two would degrade the timing of flip-flop 210, flip-flop 206 is reconnected to clock leaf 104-1. That is, control circuit 107-1 in the before view is reprogrammed with a different value in control circuit 107-1' in the after view to select the clock signal on connection 226 instead of the clock signal on connection 224. Thus, the hold violation of flip-flop 206 is resolved without degrading the timing of flip-flop 210.

Figure 3:
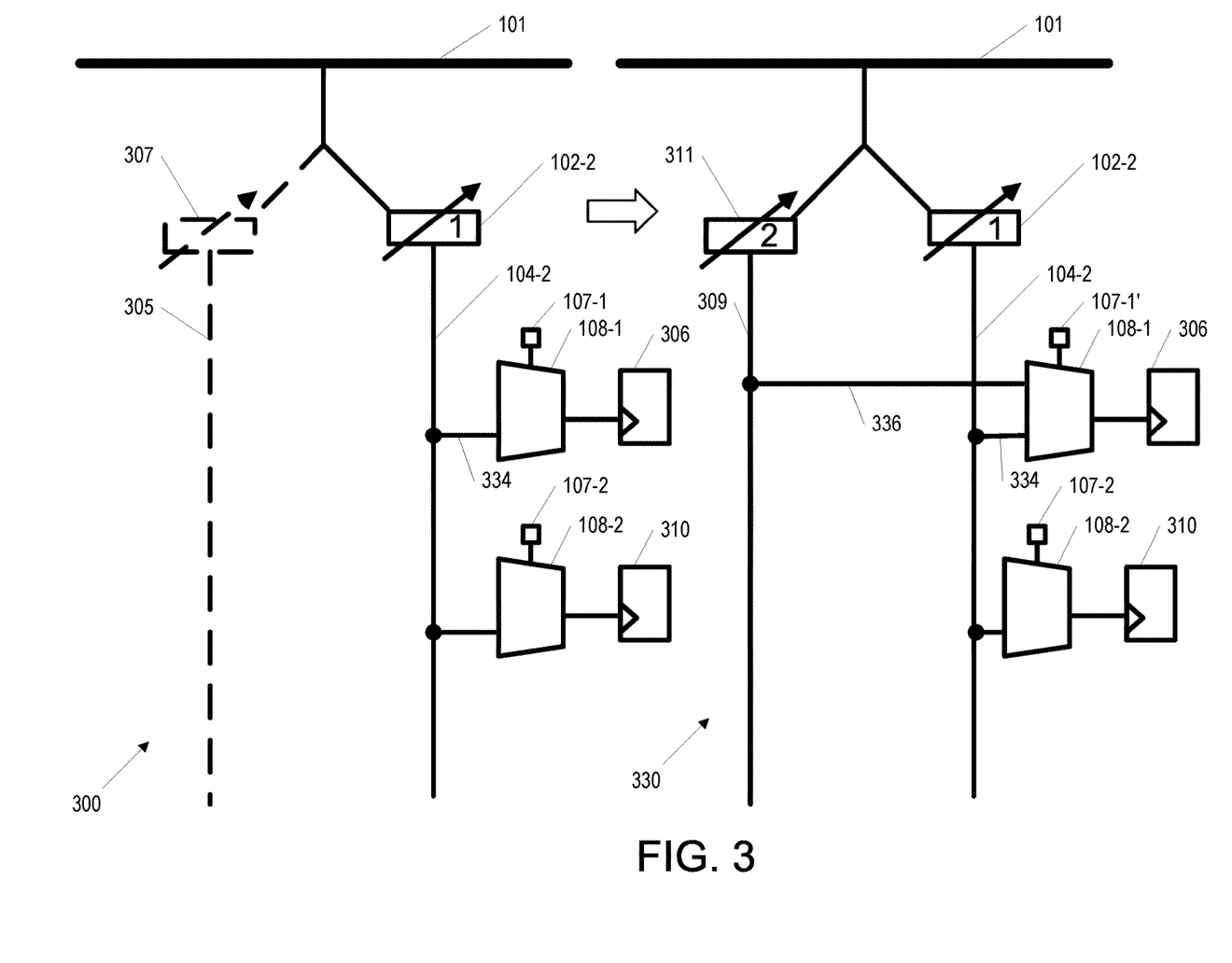
FIG. 3 illustrates before and after views of a circuit design in which a target cell is reconnected to a newly instantiated clock leaf having a different delay value.

FIG. 3 illustrates before and after views of a circuit design in which a target cell is reconnected to a newly instantiated clock leaf having a different delay value. Clock leaf 305 and programmable delay circuit 307 of circuit design 300 are not instantiated ("uninstantiated") in circuit design 300 and are represented by dashed lines. In the example of FIG. 3, flip-flop 306 is the target flip-flop. To resolve a hold violation of flip-flop 306, the delay of the clock signal received by flip-flop 306 is to be adjusted. In response to determining that adjusting the delay value specified for programmable delay circuit 102-2 from one to two would degrade the timing of flip-flop 310, flip-flop 306 is to be reconnected to a clock leaf having a programmable delay circuit specified with the delay value of two to avoid degrading the timing of flip-flop 310. However, as no clock leaf has yet been instantiated having a programmable delay circuit specified with the delay value of two, the EDA system instantiates clock leaf 309 as shown in the modified circuit design 330. The clock leaf 309 corresponds to uninstantiated clock leaf 305 in circuit design 300. The programmable delay circuit 311 in circuit design 330 is specified with the desired delay for flip-flop 306. Flip-flop 306 is then reconnected to clock leaf 309 through connection 336 by reprogramming control circuit 107-1 in the before view with a different value in control circuit 107-1' in the after view to control the selection by multiplexer 108-1.

Figure 4:
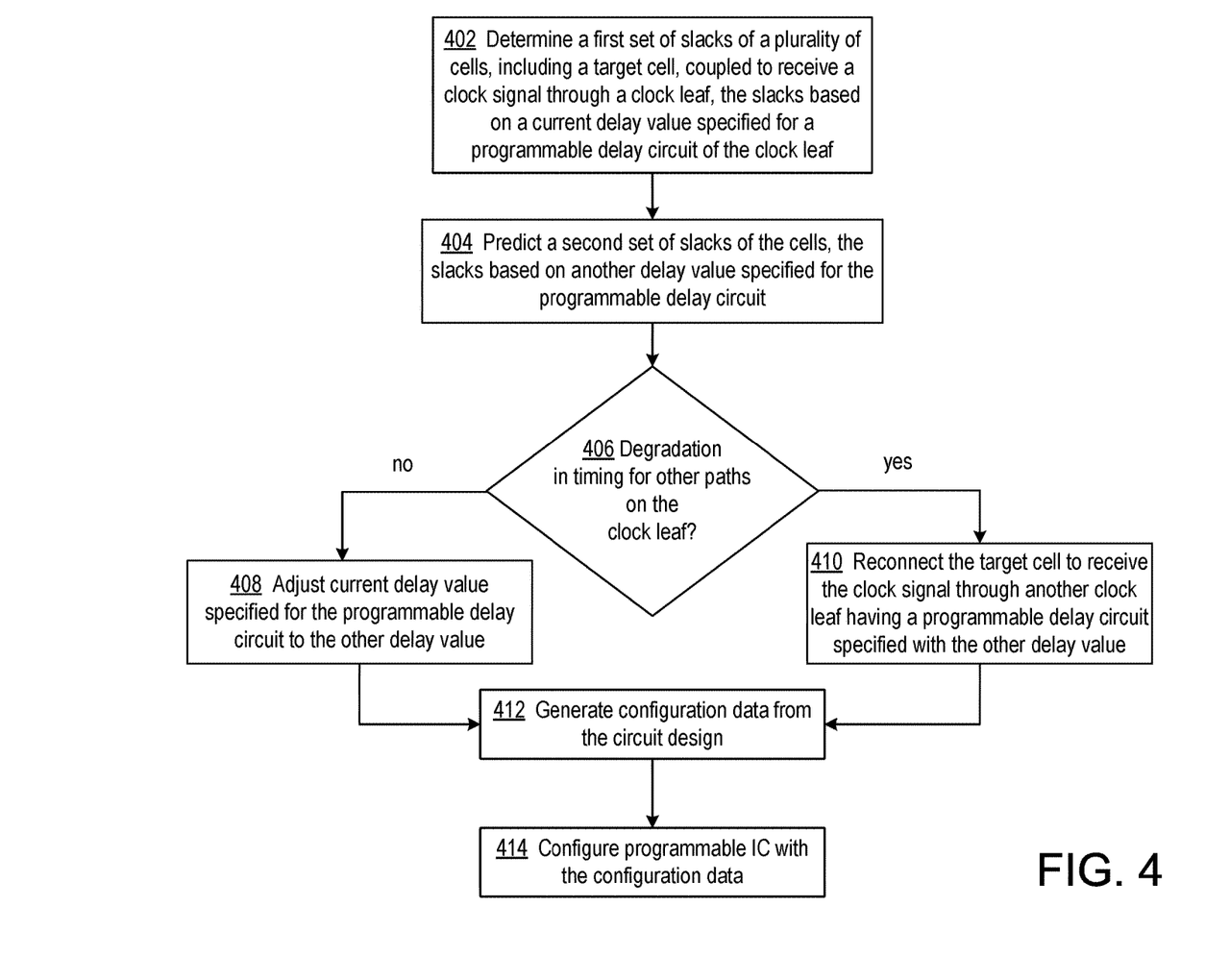
FIG. 4 illustrates a flowchart of an exemplary process for adjusting a delay of a clock signal to a target cell of a circuit design.

FIG. 4 illustrates a flowchart of an exemplary process for adjusting a delay of a clock signal to a target cell of a circuit design. At block 402, the system determines a first set of slacks of cells in the circuit design. The cells are coupled to receive a clock signal through a clock leaf that includes a target cell. The slacks of the first set, which can include setup slacks and/or hold slacks, are based on a current delay value specified for a programmable delay circuit of the clock leaf. Determining the first set of slacks can include getting the clock leaf of the target cell and getting the delay value specified for the programmable delay circuit of that clock leaf.

At block 404, the system predicts a second set of slacks of the cells of the same clock leaf. The slacks of the second set, which can include setup slacks and/or hold slacks, are based on another delay value specified for the programmable delay circuit of the clock leaf. The delay value is not yet adjusted to the other delay value, rather the effect of adjusting the delay value to the other delay value is predicted. Although not illustrated in FIG. 4, the method can include identifying a critical timing path in the circuit design where the target cell is on the critical path. As used herein, "critical timing path" refers to a path having a timing violation. The other delay value can be selected to reduce or resolve a timing violation of the critical timing path.

At block 406, the system determines whether or not the second set of slacks indicates degradation in timing of cells other than the target cell relative to the first set of slacks. For example, the timing violation of the target cell may be resolved by adjusting the delay value to the other delay value, but the change may introduce a timing violation in one or more other cells of the clock leaf. If the second set of slacks indicates no degradation in timing, then at block 408, the current delay value specified for the programmable delay circuit of the clock leaf is adjusted to the other delay value. Subsequent to adjusting the delay value, at block 412, configuration data is generated from the circuit design with the adjusted delay value for implementing a circuit from the circuit design. For example, place-and-route and bitstream generation tools may be executed to generate configuration data for manufacturing an ASIC or for programming an FPGA. At block 414, an IC device can be manufactured from the configuration data. For example, an ASIC can be fabricated or a programmable IC may be configured with the configuration data.

If the second set of slacks indicates degradation in timing, then at block 410, the target cell is reconnected to receive the clock signal through another clock leaf that has a programmable delay circuit specified with the other delay value. Subsequent to reconnecting the target cell, at block 412, configuration data is generated from the circuit design with the adjusted delay value and, at block 414, a circuit can be manufactured from the configuration data as described above.

The other clock leaf can be a clock leaf that, prior to reconnecting the target cell to the other clock leaf, had cells coupled to receive the clock signal through the other clock leaf as described above in association with FIG. 2. Alternatively, the other clock leaf can be a clock leaf that is instantiated in response to determining that the second set of slacks indicates degradation in timing above in association with FIG. 3. The programmable delay circuit of the instantiated clock leaf is specified with the other delay value and the target cell is reconnected to the instantiated clock leaf. The other clock leaf can be a newly instantiated clock leaf if there are no clock leaf having a programmable delay circuit specified with the other delay value.

The operations of blocks 402, 404, 406, 408, and/or 410 can be performed on a placed-and-routed circuit design in order to opportunistically improve timing. In another implementation, the operations can be performed prior to placing-and-routing the circuit design.

Figure 5:
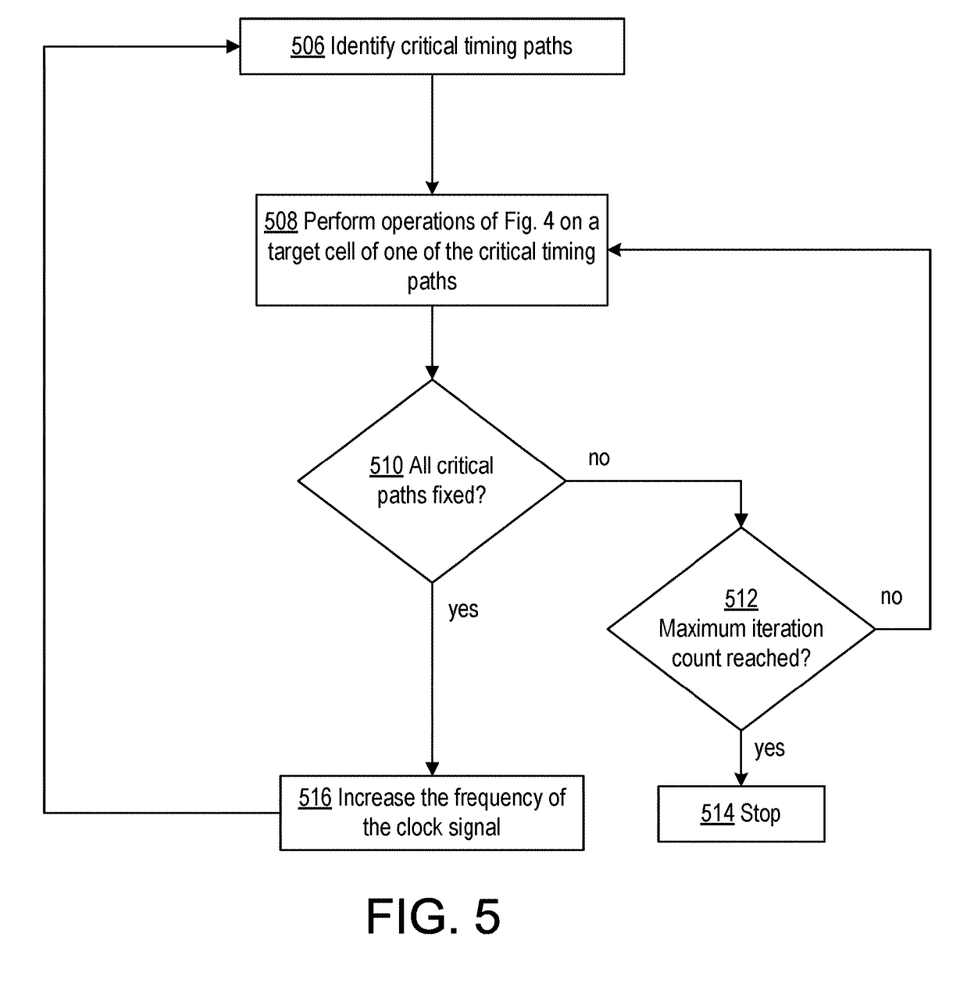
FIG. 5 illustrates a flowchart of an exemplary process for optimizing timing of critical timing paths of a circuit design.

FIG. 5 illustrates a flowchart of an exemplary process for optimizing timing of critical timing paths of a circuit design. At block 506, the EDA system identifies the critical paths of the circuit design based on a first frequency of a clock signal. Critical paths and slacks can be determined using static timing analysis tools of the EDA, for example. A target cell on each critical timing path is coupled to receive the clock signal through a first clock leaf of a plurality of clock leaves of the circuit design.

At block 508, the system performs one or more of the operations of FIG. 4 on a target cell of one of the critical timing paths. As described in FIG. 4, the EDA system determines a first set of slacks of the cells, including the target cell, that are coupled to receive the clock signal through the first clock leaf. The slacks of the first set are based on a current delay value specified for a first programmable delay circuit of the first clock leaf. The EDA system predicts a second set of slacks of the cells based on another delay value specified for the first programmable delay circuit. The current delay value of the first programmable delay circuit can be adjusted or the target cell can be reconnected to a different clock leaf in order to remedy the timing violation.

At block 510, the EDA system determines whether or not all the critical timing paths have been fixed. If there are critical timing paths remaining to be fixed, for example, the timing violations are not reduced or resolved, decision block 512 checks to see if a maximum iteration count has been reached. If so, the optimization process stops at block 514. Otherwise, the optimization process returns to block 508. If all the critical timing paths have been fixed, for example, the timing violations are reduced or resolved, then, at block 516, the frequency of the clock signal can be increased. After increasing the frequency, the optimization process returns to block 506.

The disclosed approaches can improve the performance of a circuit implemented from a circuit design. For example, the QoR can be improved such that the performance of an IC programmed with the optimized circuit design is improved. A small increase in the frequency of a clock signal can have a significant impact on the performance of the circuit design.

Figure 6:
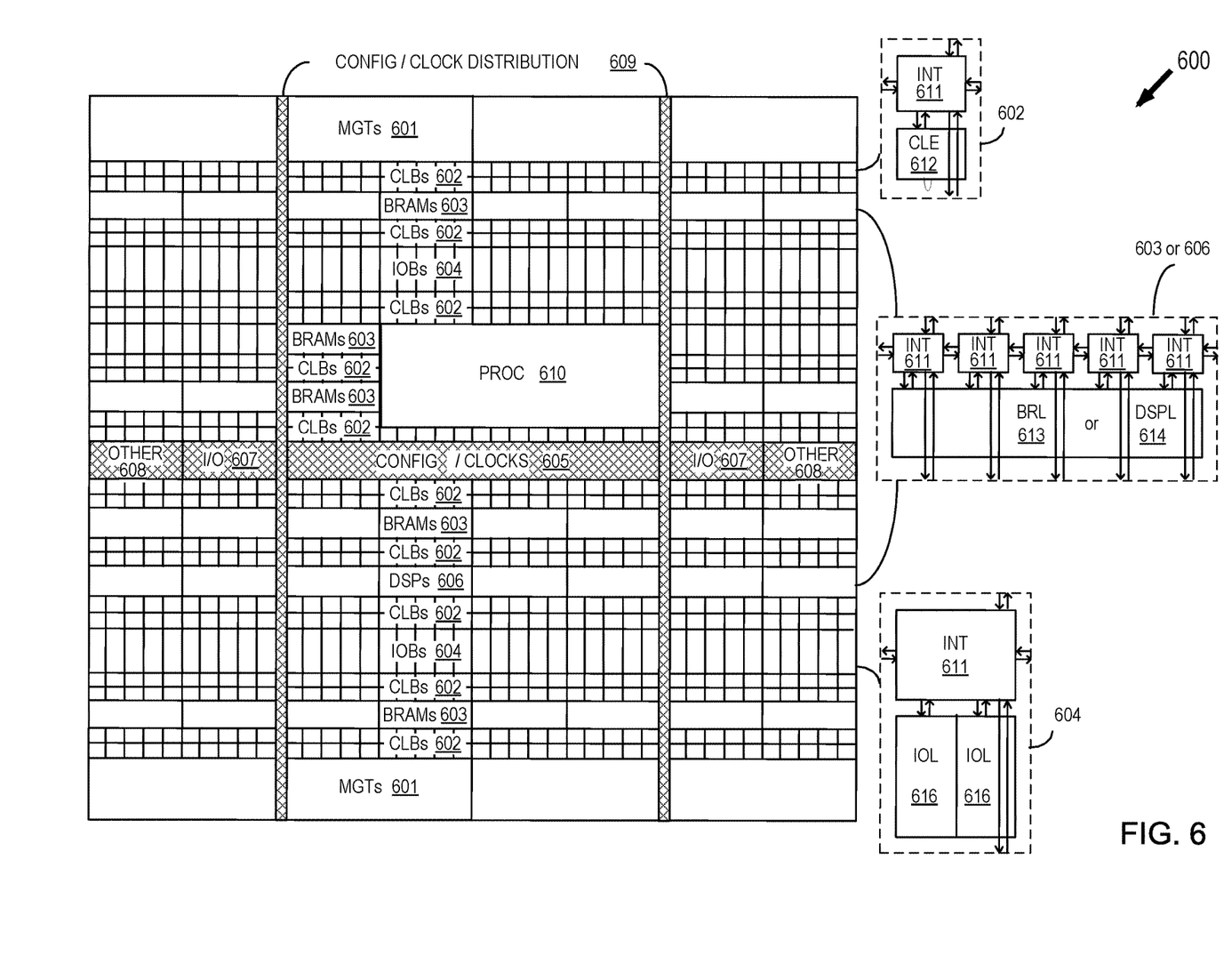
FIG. 6 illustrates an FPGA implementation of a programmable integrated circuit (IC)

FIG. 6 illustrates a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the illustrated circuit, a BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 616 in addition to one instance of the programmable interconnect element INT 611. As will be clear to those of skill in the art, the actual I/O bond pads connected, for example, to the I/O logic element 616, are manufactured using metal layered above the various illustrated logic blocks, and typically are not confined to the area of the input/output logic element 616.

A columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Figure 7:
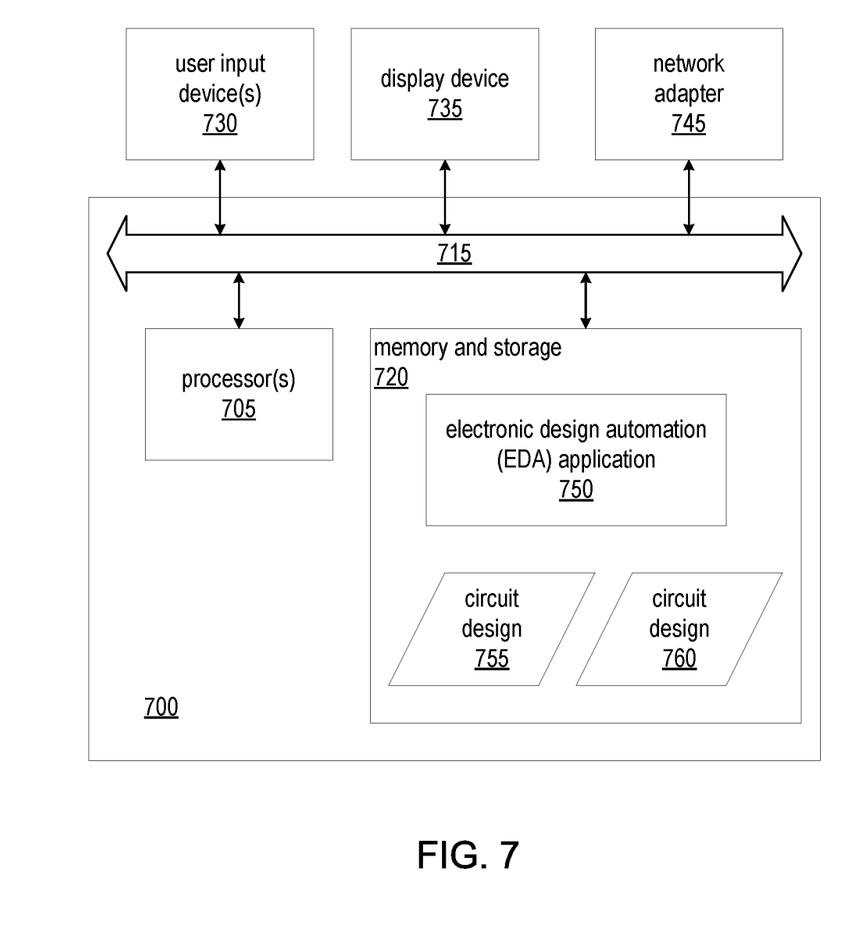
FIG. 7 illustrates a block diagram illustrating an exemplary data processing system.

FIG. 7 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 100 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 755. In one aspect, system 700 performs a design flow on circuit design 755, and the design flow can include synthesis, mapping, placement, routing, and the application of the approaches for optimizing the timing of a circuit design as described herein. System 700 generates an optimized, or modified, version of circuit design 100 as circuit design 760. Circuit design 755 can be analogous to circuit designs 100, 200, and 300 (not having adjusted delay values) illustrated in FIGS. 1-3. Circuit design 760 can be analogous to circuit designs 100, 220, and 330 (having adjusted delay values) illustrated in FIGS. 1-3.

EDA application 750, circuit design 100, circuit design 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for preparing and/or maintaining circuit designs. Other aspects and features will be apparent to those skilled in the art from consideration of the specification. It is intended that the specification and drawings be considered as examples only, with a true scope of the invention being indicated by the following claims.

What is claimed is:

1. A computer-implemented method of processing a circuit design, comprising:
    performing operations on a processor including:
        determining a timing violation of a target cell coupled to receive a clock signal through a first clock leaf of a plurality of clock leaves of the circuit design;
        determining a first set of slacks of a plurality of cells, including the target cell, coupled to receive the clock signal through the first clock leaf, wherein slacks of the first set are based on a current delay value specified for a first programmable delay circuit of the first clock leaf;
        predicting a second set of slacks of the cells based on another delay value specified for the first programmable delay circuit of the first clock leaf, wherein the other delay value is sufficient to resolve the timing violation of the target cell;
        determining whether or not the second set of slacks indicates a degradation in timing relative to the first set of slacks;
        adjusting the current delay value of the first programmable delay circuit of the first clock leaf to the other delay value in response to determining the second set of slacks indicates no degradation in timing relative to the first set of slacks; and
        reconnecting the target cell to receive the clock signal from a second clock leaf having a second programmable delay circuit specified with the other delay value in response to determining the second set of slacks indicates degradation in timing relative to the first set of slacks.

2. The method of claim 1, wherein prior to the reconnecting of the target cell to the second clock leaf, one or more cells other than the plurality of cells are coupled to receive the clock signal through the second clock leaf.

3. The method of claim 1, wherein the reconnecting the target cell includes:
    instantiating the second clock leaf in the circuit design in response to determining the second set of slacks indicates degradation in timing relative to the first set of slacks; and
    reconnecting the target cell to receive the clock signal from the instantiated second clock leaf.

4. The method of claim 1, further comprising:
    placing and routing the circuit design; and
    wherein the determining the first set of slacks, the predicting the second set of slacks, the determining the degradation in timing relative to the first set of slacks, and the adjusting are performed by the processor subsequent to the placing and routing.

5. The method of claim 1, wherein in response to the target cell being an end point cell of a setup critical timing path:
    the adjusting the current delay value to the other delay value includes adjusting the current delay value to an adjusted delay value that is greater than the current delay value; and
    the reconnecting the target cell includes reconnecting the target cell to receive the clock signal through the second clock leaf having the second programmable delay circuit specified with a delay value greater than the current delay value.

6. The method of claim 1, wherein in response to the target cell being an end point cell of a hold critical timing path:
    the adjusting the current delay value to the other delay value includes adjusting the current delay value to an adjusted delay value that is less than the current delay value; and
    the reconnecting the target cell includes reconnecting the target cell to receive the clock signal through the second clock leaf having the second programmable delay circuit specified with a delay value less than the current delay value.

7. The method of claim 1, wherein in response to the target cell being a starting point cell of a setup critical timing path:
    the adjusting the current delay value to the other delay value includes adjusting the current delay value to an adjusted delay value that is less than the current delay value; and
    the reconnecting the target cell includes reconnecting the target cell to receive the clock signal through the second clock leaf having the second programmable delay circuit specified with a delay value that is less than the current delay value.

8. The method of claim 1, wherein in response to the target cell being a starting point cell of a hold critical timing path:
    the adjusting the current delay value to the other delay value includes adjusting the current delay value to an adjusted delay value that is greater than the current delay value; and
    the reconnecting the target cell includes reconnecting the target cell to receive the clock signal through the second clock leaf having the second programmable delay circuit specified with a delay value that is greater than the current delay value.

9. The method of claim 1, further comprising:
identifying a critical timing path in the circuit design, wherein the target cell is on the critical timing path; and
selecting the other delay value that would reduce a timing violation of the critical timing path.

10. The method of claim 1, further comprising:
generating configuration data from the circuit design; and
configuring a programmable IC with the configuration data.

11. A computer-implemented method of processing a circuit design, comprising:
    performing operations on a programmed processor including:
        identifying one or more critical timing paths having respective timing violations based on a first frequency of a clock signal, wherein a respective target cell on each critical timing path is coupled to receive the clock signal through a first clock leaf of a plurality of clock leaves of the circuit design;
        for each respective target cell of the one or more critical timing paths, performing operations including:

determining a first set of slacks of a plurality of cells, including the target cell, coupled to receive the clock signal through the first clock leaf, wherein the slacks of the first set are based on a current delay value specified for a first programmable delay circuit of the first clock leaf;

predicting a second set of slacks of the plurality of cells based on another delay value specified for the first programmable delay circuit, wherein the other delay value is sufficient to resolve the respective timing violation;

determining whether or not the second set of slacks indicates a degradation in timing relative to the first set of slacks;

adjusting the current delay value of the first programmable delay circuit to the other delay value in response to determining the second set of slacks indicates no degradation in timing relative to the first set of slacks; and reconnecting the target cell to receive the clock signal through a second clock leaf having a second programmable delay circuit specified with the other delay value in response to determining the second set of slacks indicates degradation in timing relative to the first set of slacks; and repeating the identifying and the performing operations for each respective target cell for a second frequency of the clock signal that is greater than the first frequency.

12. The method of claim 11, wherein in response to a respective target cell being an end point cell of the setup critical timing paths:

the adjusting the current delay value to the other delay value includes adjusting the current delay value to a delay value that is greater than the current delay value; and the reconnecting the target cell includes reconnecting the target cell to receive the clock signal through the second clock leaf having the second programmable delay circuit specified with a delay value greater than the current delay value.

13. The method of claim 11, wherein in response to a respective target cell being an end point cell of the hold critical timing paths:

the adjusting the current delay value to the other delay value includes adjusting the current delay value to a delay value that is less than the current delay value; and the reconnecting the target cell includes reconnecting the target cell to receive the clock signal through the second clock leaf having the second programmable delay circuit specified with a delay value less than the current delay value.

14. The method of claim 11, wherein in response to a respective target cell being a starting point cell of the setup critical timing paths:

the adjusting the current delay value to the other delay value includes adjusting the current delay value to an adjusted delay value that is less than the current delay value; and the reconnecting the target cell includes reconnecting the target cell to receive the clock signal through the second clock leaf having the second programmable delay circuit specified with a delay value less than the current delay value.

15. The method of claim 11, wherein in response to a respective target cell being a starting point cell of the hold critical timing paths:

the adjusting the current delay value to the other delay value includes adjusting the current delay value to an adjusted delay value that is greater than the current delay value; and the reconnecting the target cell includes reconnecting the target cell to receive the clock signal through the second clock leaf having the second programmable delay circuit specified with a delay value greater than the current delay value.

16. The method of claim 11, further comprising:
generating configuration data from the circuit design; and
configuring a programmable IC with the configuration data.

17. A system, comprising:
a computer system including:
a processor; and
a memory configured with instructions that when executed by the processor cause the processor to perform operations including:

determining a timing violation of a target cell coupled to receive a clock signal through a first clock leaf of a plurality of clock leaves of the circuit design;

determining a first set of slacks of a plurality of cells, including the target cell, coupled to receive the clock signal through the first clock leaf, wherein slacks of the first set are based on a current delay value specified for a first programmable delay circuit of the first clock leaf;

predicting a second set of slacks of the cells based on another delay value specified for the first programmable delay circuit, wherein the other delay value is sufficient to resolve the timing violation of the target cell;

determining whether or not the second set of slacks indicates a degradation in timing relative to the first set of slacks;

adjusting the current delay value of the first programmable delay circuit to the other delay value in response to determining the second set of slacks indicates no degradation in timing relative to the first set of slacks; and reconnecting the target cell to receive the clock signal from a second clock leaf having a second programmable delay circuit specified with the other delay value, in response to determining the second set of slacks indicate degradation in timing relative to the first set of slacks.

18. The system of claim 17, wherein one or more cells other than the plurality of cells are coupled to receive the clock signal through the second clock leaf prior to the reconnecting of the target cell to the second clock leaf.

19. The system of claim 17, wherein the memory is configured with instructions that when executed by the processor cause the processor to perform operations including:

instantiating the second clock leaf in the circuit design in response to determining the second set of slacks indicates degradation in timing relative to the first set of slacks; and reconnecting the target cell to receive the clock signal from the instantiated second clock leaf.

20. The system of claim 17, wherein the memory is configured with instructions that when executed by the processor cause the processor to perform operations including:

generating configuration data from the circuit design; and configuring a programmable IC with the configuration data.

\* \* \* \* \*